(12) United States Patent
Takano

(10) Patent No.: US 12,394,439 B2
(45) Date of Patent: *Aug. 19, 2025

(54) HARD DISK DRIVE INCLUDING ANNULAR SPACER WITH INCLINED REGION ON MAIN SURFACE

(71) Applicant: HOYA CORPORATION, Tokyo (JP)

(72) Inventor: Masao Takano, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,466

(22) Filed: Jun. 26, 2024

(65) Prior Publication Data

US 2024/0347076 A1 Oct. 17, 2024

Related U.S. Application Data

(63) Continuation of application No. 18/029,251, filed as application No. PCT/JP2021/036234 on Sep. 30, 2021, now Pat. No. 12,051,442.

(60) Provisional application No. 63/085,262, filed on Sep. 30, 2020.

(51) Int. Cl.
  *G11B 17/038* (2006.01)
  *G11B 25/04* (2006.01)

(52) U.S. Cl.
  CPC .......... *G11B 17/038* (2013.01); *G11B 25/043* (2013.01)

(58) Field of Classification Search
  None
  See application file for complete search history.

(56) References Cited

U.S. PATENT DOCUMENTS

| 5,969,902 A | 10/1999 | Okumura et al. |
| 6,172,844 B1 | 1/2001 | Luo et al. |
| 6,201,661 B1 | 3/2001 | Korkowski |

(Continued)

FOREIGN PATENT DOCUMENTS

| JP | H03-20072 U | 2/1991 |
| JP | H03-054782 A | 3/1991 |

(Continued)

OTHER PUBLICATIONS

Translation of the International Search Report mailed on Dec. 14, 2021.

*Primary Examiner* — Craig A. Renner
(74) *Attorney, Agent, or Firm* — Global IP Counselors, LLP

(57) ABSTRACT

A hard disk drive includes a magnetic disk, and an annular spacer. The annular space includes two main surfaces, an inner circumferential surface, an outer circumferential surface, and a chamfered surface present between the outer circumferential surface and each of the two main surfaces. The annular spacer is disposed such that one of the two main surfaces is in contact with the magnetic disk. At least one main surface of the two main surfaces includes an inclined region, and the inclined region is inclined in an outer circumferential region of the at least one main surface toward a boundary between the at least one main surface and the chamfered surface such that a surface height of the spacer gradually decreases toward the boundary. The magnetic disk has a thickness of 0.55 mm or less. A material of a substrate for the magnetic disk includes aluminum alloy.

20 Claims, 5 Drawing Sheets

Cross-sectional view taken along line A-A

(56) References Cited

U.S. PATENT DOCUMENTS

| | | | |
|---|---|---|---|
| 6,208,486 B1 | 3/2001 | Gustafson et al. | |
| 6,215,617 B1 | 4/2001 | Okumura et al. | |
| 6,381,092 B1 | 4/2002 | Suzuki | |
| 6,707,637 B1 | 3/2004 | Codilian et al. | |
| 8,980,447 B2 * | 3/2015 | Uchida | G11B 5/82 428/827 |
| 12,051,442 B2 * | 7/2024 | Takano | G11B 5/82 |
| 2002/0071205 A1 | 6/2002 | Koyanagi et al. | |
| 2003/0175471 A1 | 9/2003 | Kaneko | |
| 2003/0179494 A1 | 9/2003 | Kaneko | |
| 2003/0223280 A1 | 12/2003 | Okumura et al. | |
| 2004/0032690 A1 | 2/2004 | Kovinskaya et al. | |
| 2008/0180837 A1 | 7/2008 | Lee | |
| 2009/0083772 A1 | 3/2009 | Miyamori et al. | |
| 2014/0078616 A1 | 3/2014 | Aiello et al. | |
| 2020/0258540 A1 | 8/2020 | Uehara | |
| 2020/0327903 A1 | 10/2020 | Uehara | |
| 2020/0395046 A1 | 12/2020 | Takano et al. | |
| 2021/0174828 A1 | 6/2021 | Uehara | |
| 2022/0301585 A1 | 9/2022 | Uehara | |

FOREIGN PATENT DOCUMENTS

| | | | |
|---|---|---|---|
| JP | H08-315533 A | 11/1996 |
| JP | 2003-045139 A | 2/2003 |
| JP | 2003-272337 A | 9/2003 |
| JP | 4136268 B2 | 8/2008 |
| JP | 2012-221537 A | 11/2012 |
| JP | 2019-036371 A | 3/2019 |
| JP | 2019-125413 A | 7/2019 |
| JP | 2020-129423 A | 8/2020 |

* cited by examiner

Cross-sectional view taken along line A-A

HARD DISK DRIVE INCLUDING ANNULAR SPACER WITH INCLINED REGION ON MAIN SURFACE

CROSS-REFERENCE TO RELATED APPLICATIONS

This is a continuation application of U.S. patent application Ser. No. 18/029,251, filed on Mar. 29, 2023, which is a U.S. National stage application of International Patent Application No. PCT/JP2021/036234, filed on Sep. 30, 2021, which, in turn, claims priority to U.S. Provisional Patent Application No. 63/085,262, filed on Sep. 30, 2020. The entire contents of U.S. Provisional Patent Application No. 63/085,262, International Patent Application No. PCT/JP2021/036234, and U.S. patent application Ser. No. 18/029,251 are hereby incorporated herein by reference.

BACKGROUND

Field of the Invention

The present invention relates to an annular spacer to be arranged in contact with a magnetic disk in a hard disk drive device, and a hard disk drive device.

Background Information

Following the expansion of cloud computing in recent years, many hard disk drive devices (hereinafter also referred to as HDD devices) are used in a data center for a cloud in order to increase storage capacity.

Annular spacers are provided between magnetic disks installed in an HDD device in order to keep the magnetic disks spaced apart from each other. These spacers function to precisely position the magnetic disks at predetermined positions spaced apart from each other without the magnetic disks coming into contact with each other.

In the HDD device, a laminate of magnetic disks and spacers is formed by inserting a spindle into inner holes of the magnetic disks and the spacers with the spacers interposed between magnetic disks, and the laminate is pressed by a clamping member from one side of the laminate, and thus the magnetic disks and the spacers are fixed.

Glass spacers whose portions, which are in contact with substrates for information recording media, have an average surface roughness of 0.001 to 0.005 μm are known, for example (Japanese Patent No. 4136268).

SUMMARY

It has been found that, in an HDD device in which magnetic disks are fixed using the above-mentioned spacers, the flatness of the main surfaces of the magnetic disk closest to the clamping member significantly deteriorates. This deterioration in flatness is not favorable because fluttering is likely to occur when the magnetic disk rotates at high speed. Also, deterioration in flatness is not favorable because a magnetic disk and a ramp member where a magnetic head is retracted are likely to come into contact with each other.

In view of this, the present invention aims to provide a spacer for use in a hard disk drive device, the spacer suppressing deterioration in flatness of a magnetic disk, which is fixed using a clamp.

One aspect of the present invention is a hard disk drive that includes a magnetic disk and an annular spacer. The annular space includes two main surfaces, an inner circumferential surface, an outer circumferential surface, and a chamfered surface present between the outer circumferential surface and each of the two main surfaces. The annular spacer is disposed such that one of the two main surfaces is in contact with the magnetic disk. At least one main surface of the two main surfaces includes an inclined region, and the inclined region is inclined in an outer circumferential region of the at least one main surface toward a boundary between the at least one main surface and the chamfered surface such that a surface height of the spacer gradually decreases toward the boundary. The magnetic disk has a thickness of 0.55 mm or less. A material of a substrate for the magnetic disk includes aluminum alloy It is preferable that a drop amount of the inclined region that is inclined toward the other main surface side of the spacer is 0.1 to 2 μm.

It is preferable that the inclined region of the spacer is a curved surface that protrudes in a direction from the inside to the outside of the spacer.

It is preferable that a Young's modulus of a material of the spacer is smaller than a Young's modulus of a substrate that constitutes the magnetic disk.

It is preferable that a material of the spacer includes aluminum or aluminum alloy.

It is preferable that the spacer has a conductive film on a surface of the spacer.

It is preferable that the hard disk drive further includes ten or more magnetic disks.

According to the above-described spacer, it is possible to suppress deterioration in flatness of magnetic disks fixed using a clamp.

DETAILED DESCRIPTION OF THE EMBODIMENTS

A spacer of the present invention is described below in detail.

Figure 1:
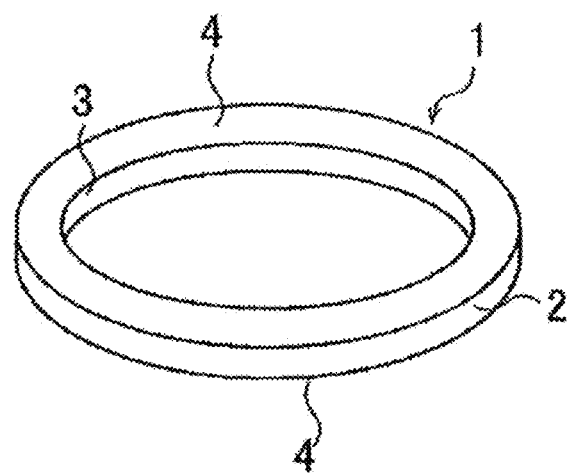
FIG. 1 is an external perspective view of a spacer for a magnetic disk according to an embodiment.
Figure 2:
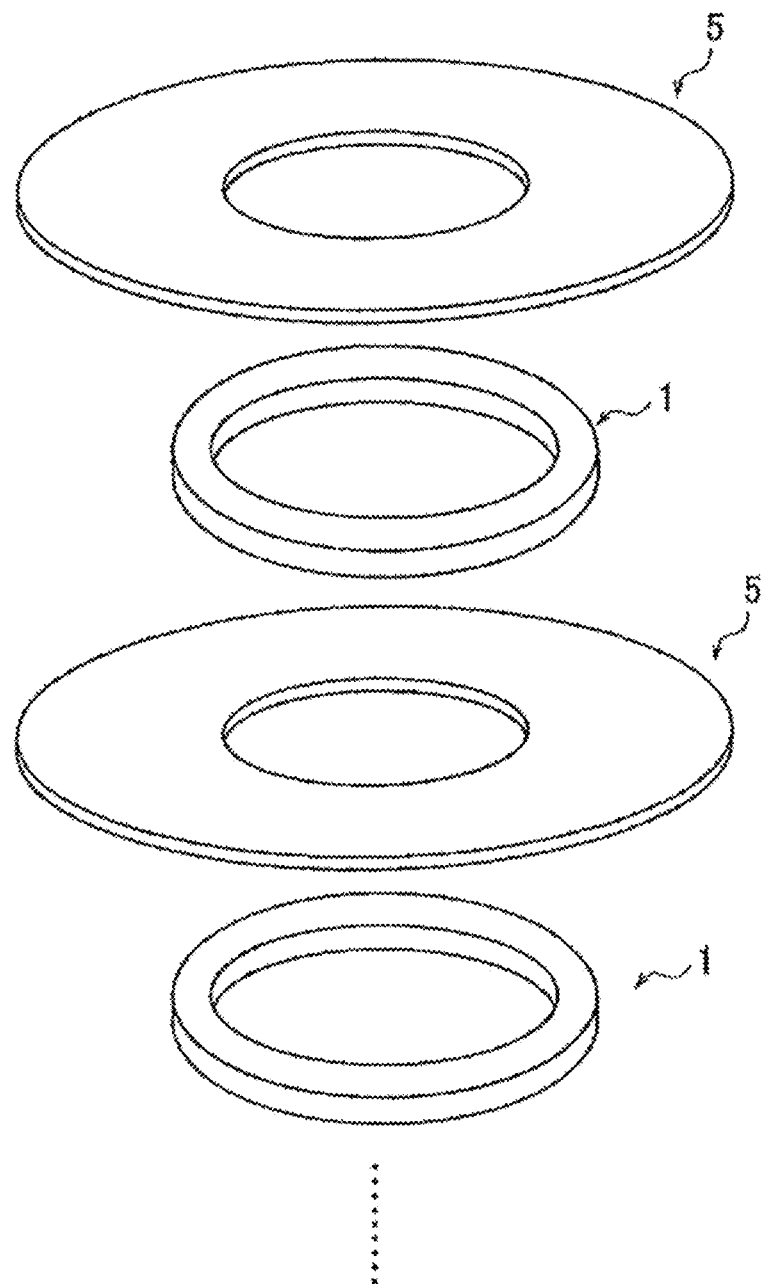
FIG. 2 is a diagram illustrating an arrangement of spacers according to an embodiment and magnetic disks.
Figure 3:
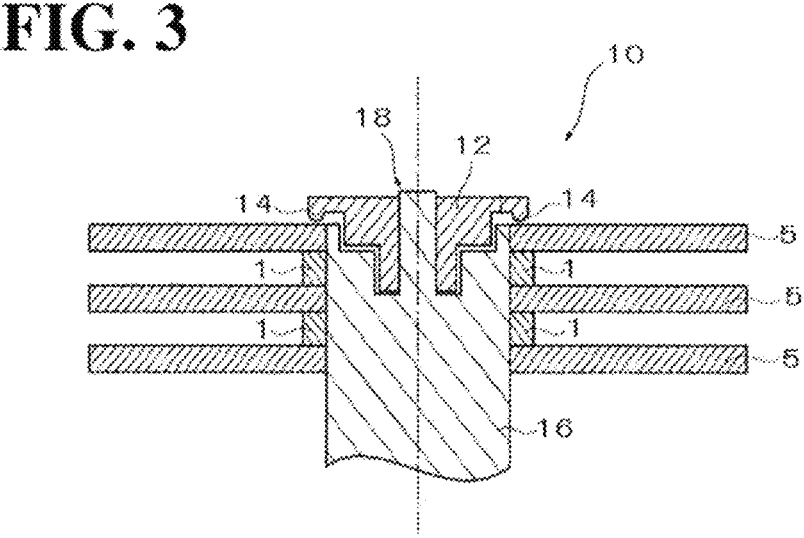
FIG. 3 is a cross-sectional view showing a main portion of an exemplary structure of an HDD device in which spacers according to an embodiment are installed.

FIG. 1 is an external perspective view of a glass spacer (hereinafter simply referred to as a "spacer") 1 according to an embodiment, and FIG. 2 is a diagram illustrating an arrangement of spacers 1 and magnetic disks 5. FIG. 3 is a cross-sectional view showing a main portion of an exemplary structure of an HDD device 10 in which the spacers 1 are installed. The material of the spacers 1 described below contains glass, but the spacer 1 is not necessarily limited to containing glass. It is also possible to use, as another material of the spacers 1, metal materials such as stainless steel, titanium, aluminum, or aluminum alloys, ceramic materials, and the like.

The spacers 1 are installed in an HDD device by alternately stacking the magnetic disks 5 and the spacers 1 on each other as shown in FIG. 2. As shown in FIG. 3, the plurality of magnetic disks 5 are fixed to a spindle 16 that rotates, such that the spindle 16 passes through the magnetic disks 5 and the spacers 1 are interposed between the magnetic disks 5, and the magnetic disks 5 are pressed by a clamping member 12 that is fixed by a screw or the like from above a laminate of the magnetic disks 5 and the spacers 1, and thus the magnetic disks 5 are attached at predetermined intervals. The clamping member 12 directly and locally presses the uppermost magnetic disk 5 supported by a spacer 1 from below. A protrusion 14 for pressing the magnetic disk 5 is provided on the clamping member 12 in a circular shape around the central axis of the spindle 16. A cross-section of a leading end of the protrusion 14 in a radial direction of the clamping member has an arc shape. The uppermost magnetic disk 5 is clamped as a result of being pressed by the clamping member 12 in this manner. The entire laminate is also clamped by this pressing force.

Note that the spacer 1 described in the following embodiment is provided between two magnetic disks 5 while being in contact therewith.

As shown in FIG. 1, the spacer 1 has an annular shape and includes an outer circumferential surface 2, an inner circumferential surface 3, and main surfaces 4 that oppose each other. The two main surfaces are substantially parallel to each other. Also, the inner circumferential surface 3 and the outer circumferential surface 2 are substantially perpendicular to the two main surfaces 4. A chamfered surface (not shown) may be provided on the surface of the spacer 1 as appropriate. Here, "substantially parallel" refers to the degree of parallelism being 5 μm or less, for example. Also, "substantially perpendicular" refers to the angle between two points being 85 to 95 degrees, for example.

The inner circumferential surface 3 is a surface that comes into contact with the spindle 16, and a wall surface that surrounds a hole whose inner diameter is slightly larger than the outer diameter of the spindle 16.

The main surfaces 4 are two surfaces that come into contact with magnetic disks 5. The main surfaces 4 of the spacer 1 come into contact with main surfaces of magnetic disks 5 and fix the magnetic disks 5 using a frictional force. The magnetic disks 5 fixed in this manner can be rotated at high speed by rotation of the spindle 16, and magnetic information is read or written by a reading/writing magnetic head (not shown).

Stainless steel, an aluminum alloy, or the like is used for the clamping member 12 that presses and fixes the magnetic disk 5 because it has high mechanical strength and rigidity and high processability. Also, the protrusion 14 that extends in an arc shape is provided in a circular shape in order to reliably press and fix the uppermost magnetic disk 5.

Figure 4:
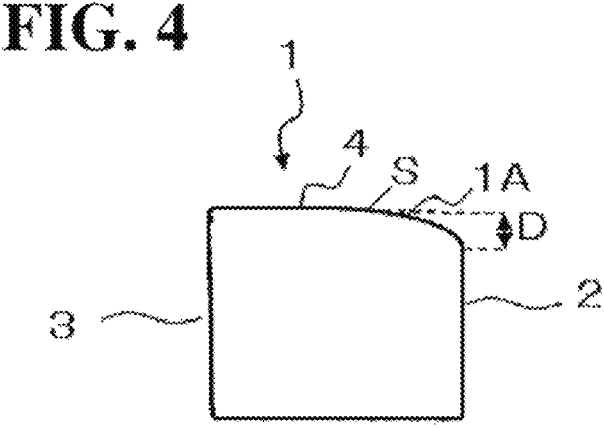
FIG. 4 is a diagram illustrating a shape of a main surface of a spacer according to an embodiment.

FIG. 4 is a diagram illustrating a cross-sectional shape of a main surface 4 of the spacer 1 (a cross-sectional shape obtained by cutting the spacer 1 in the radial direction thereof) in detail. The inclination of an inclined surface (an inclined region or an inclined portion) 1A described below is emphasized in the example shown in FIG. 4. Here, the term "inclined surface", "inclined region", or "inclined portion" refers to at least a portion of the outer circumferential region of at least one of the two main surfaces 4, the portion being inclined toward the other main surface 4 side in the radial direction from the center of the spacer 1 toward the outer circumferential surface.

A portion of the main surface 4 on at least one side of the spacer 1 is an inclined surface 1A that is inclined such that the height of the surface of the spacer 1 gradually decreases toward a corner portion between the main surface 4 and the outer circumferential surface 2 of the spacer 1. In other words, the inclined surface 1A is inclined such that the spacer 1 becomes thinner. Also, the inclined surface 1A is inclined away from the magnetic disk 5. Further, the inclined surface 1A is inclined to approach the main surface 4 on the other side of the spacer 1 in a direction toward the corner portion. Although the inclined surface 1A is provided on the upper main surface 4 in the example shown in FIG. 4, the inclined surface 1A may be provided on the upper and lower main surfaces 4.

Figure 5:
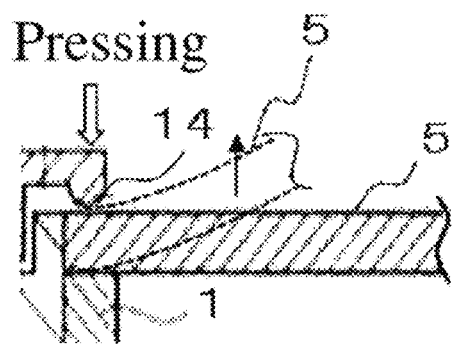
FIG. 5 is a diagram illustrating a state of a magnetic disk in an HDD device fixed using a top clamp.

The reason as to why the inclined surface 1A is provided on the outer circumferential surface 2 side of a position in the radial direction of the main surface 4 in this manner is that deterioration in flatness of the magnetic disk 5 due to warping of the magnetic disk 5 that is pressed and fixed by the clamping member 12 is suppressed. FIG. 5 is a diagram illustrating the magnetic disk 5 fixed by the clamping member 12 in a cross-sectional view.

If a conventional spacer 1 without an inclined surface 1A is used, the magnetic disk 5 is pressed by the protrusion 14 and warped upward as indicated by the dotted line in FIG. 5. It is conceivable that this upward warpage is caused by the following mechanism. That is, in recent years, because a comparatively thin plate member has been used for the magnetic disks 5, a local pressing force received from the arc-shaped leading end of the protrusion 14 does not spread to the magnetic disk 5, and the pressing force of the protrusion 14 is transmitted to the spacer 1. As a result, a portion of the main surface 4 of the spacer 1 in a direction directly below the leading end of the protrusion 14 (an intermediate circumferential portion of the main surface 4) is locally recessed as a result of being subjected to the pressing force from the protrusion 14, and accordingly the shape of the main surface 4 deforms such that a portion on the outer circumferential surface side thereof (the outer circumferential region of the main surface 4) protrudes upward from the recessed portion. It is conceivable that the magnetic disk 5 held between the spacer 1 and the clamping member 12 will warp upward as indicated by the dotted line so as to follow the deformation of the main surface 4.

In contrast, as shown in FIG. 4, with the spacer 1 of this embodiment, a portion of the main surface 4 is the inclined surface 1A that is inclined such that the spacer 1 becomes thinner toward the corner portion present between the main surface 4 and the outer circumferential surface 2 of the spacer 1. Thus, even when a portion of the main surface 4 (an intermediate circumferential region of the main surface 4) that is subjected to the pressing force of the protrusion 14 is locally recessed, a portion on the outer circumferential surface side of this portion (the outer circumferential region of the main surface 4) does not protrude upward from the recessed portion. That is, it is possible to offset the recess in the main surface 4 formed by the pressing force of the protrusion 14. In other words, considering deformation of the main surface 4 subjected to the force of the protrusion 14, the portion of the main surface 4 on the outer circumferential surface 2 side with respect to the portion subjected to the force of the protrusion 14 is the inclined surface 1A that is inclined such that the spacer 1 becomes thinner, and thus the portion on the outer circumferential surface 2 side does not protrude upward. Therefore, the magnetic disk 5 does not warp upward as indicated by the dotted line shown in FIG. 5. In other words, the inclined surface 1A is inclined away from the magnetic disk 5 toward the corner portion present between the main surface 4 and the outer circumferential surface 2 of the spacer 1.

Figure 6:
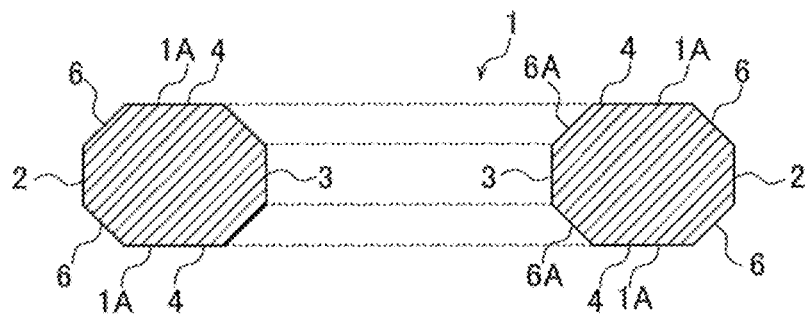
FIG. 6 is a cross-sectional view of the spacer according to an embodiment shown in FIG. 7 taken along line A-A.
Figure 7:
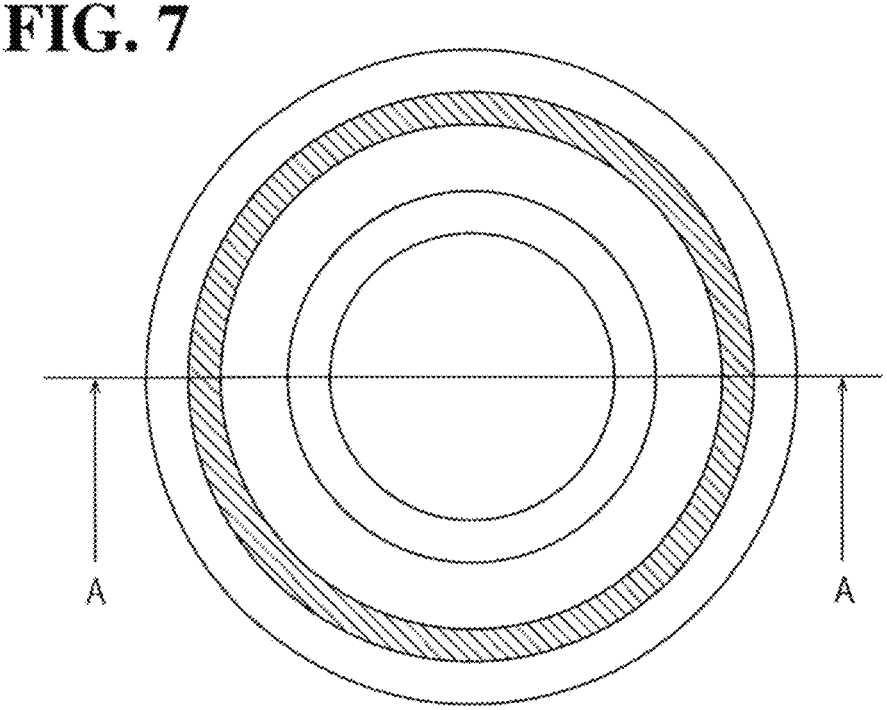
FIG. 7 is a diagram of a spacer according to an embodiment as seen from one main surface side. A hatched area indicates an outer circumferential region in FIG. 7.

FIG. 6 is a cross-sectional view of a spacer having a chamfered surface between a main surface and an outer circumferential surface. Also, FIG. 7 is a diagram of the annular spacer as seen from one main surface side, and FIG. 6 is a cross-sectional view of the spacer shown in FIG. 7 taken along line A-A. In FIG. 7, the hatched portion indicates the outer circumferential region of the main surface, and the inclined region 1A (as described above, may be referred to as an "inclined surface", an "inclined portion", or the like in this specification) that is inclined toward the other main surface side in the radial direction from the center of the spacer to the outer circumferential surface side is present in at least a portion of the outer circumferential region. On the other hand, the spacer shown in FIG. 6 includes the outer circumferential surface 2, the inner circumferential surface 3, and opposing main surfaces 4, and chamfered surfaces 6 are present between the main surfaces 4 and the outer circumferential surface 2. As shown in FIG. 6, a chamfered surface 6A may be present between a main surface 4 and the inner circumferential surface 3.

In an embodiment, it is preferable that the inclined region 1A is a curved surface that protrudes in a direction from the inside to the outside of the spacer. By forming the inclined region 1A in such a shape, the shape of the main surface 4 deformed by the pressing force of the protrusion 14 can be kept substantially horizontal without the shape of the main surface 4 curving upward or downward. The drop amount D of the inclined region 1A before being subjected to the force from the protrusion 14 (the amount of positional change from a start position S of the inclined surface 1A on the inner circumferential surface 3 side to an end position of the inclined region 1A on the outer circumferential surface 2 side in the thickness direction, and the inclined region refers to a portion of the main surface and is not included in the chamfered surface) is 2.0 μm or less, for example. If the drop amount D exceeds 2.0 μm, it may take time to manufacture the spacer 1 and production costs may increase. From a similar viewpoint, the drop amount D is more preferably 1.5 μm or less. Also, the drop amount D is preferably 0.1 μm or more. If the drop amount D is less than 0.1 μm, the effect of suppressing deterioration in the flatness of the magnetic disk 5 fixed by a clamp may be reduced.

The start position S of the inclined surface 1A is preferably located at a distance of 20% or more of a length L in the radial direction from the position of an outer circumferential edge of the main surface where the length of the main surface in the radial direction of the spacer 1 from the center of the annular shape of the spacer 1 is L (L is also referred to as the width of the main surface of the spacer 1). If the start position S of the inclined surface 1A is located at a distance of less than 20% of the length L in the radial direction from the position of the outer circumferential edge of the main surface, the effect of suppressing deterioration in the flatness of the magnetic disk 5 fixed by a clamp may be reduced.

Figure 8A:
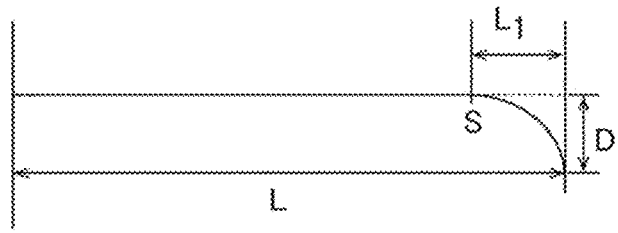
FIGS. 8A-8C are diagrams showing three examples of the shape of a main surface of a spacer according to an embodiment.
Figure 8B:
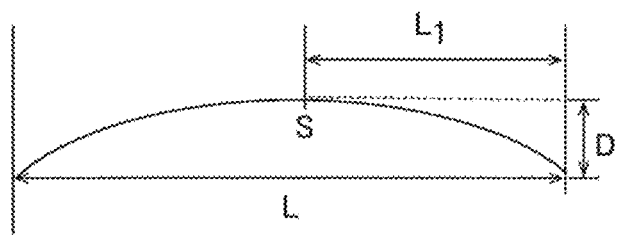
Figure 8C:
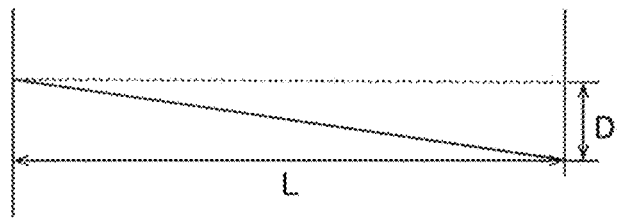

Note that FIGS. 8A-8C illustrate examples of the shape of the main surface 4 of the spacer 1 in a cross-sectional view. FIGS. 8A-8C show three representative examples of the shape of the outer circumferential region of the main surface 4 (in cross-sectional views). In all diagrams, the inclination of the inclined surface is emphasized, and no chamfered surface 6 is shown.

When a main surface of the spacer 1 has an inclined surface that is inclined such that the height of the surface of the spacer 1 gradually decreases (or the thickness of the spacer 1 gradually decreases) toward a corner portion between the main surface 4 and the outer circumferential surface 2 (note that, if a chamfered surface 6 is present between the main surface 4 and the outer circumferential surface 2, a corner portion between the main surface 4 and the chamfered surface 6), the inclined surface is referred to as having a "drooping shape" (see FIGS. 4 and 8A).

When a main surface of the spacer 1 also has another inclined surface where the surface height of the spacer 1 is reduced toward the inner circumferential surface 3 side (i.e., when a cross-sectional shape of the main surface in the radial direction is an arc shape that protrudes upward, the inclined surface is referred to as having an "arc shape" hereinafter, and see FIG. 8B), the start position S of the inclined surface 1A can be a vertex position of the arc that protrudes upward in the thickness direction of the spacer. Note that, when there are a plurality of upwardly protruding arcs on the profile of the main surface in the radial direction, the highest position in the thickness direction of the spacer can be the start position S of the inclined surface 1A. Li in FIGS. 8A and B indicates a distance in the radial direction of the spacer 1 from the start position S of the inclined surface 1A to the position of the outer circumferential edge of the main surface 4 (if the chamfered surface 6 is present between the main surface 4 and the outer circumferential surface 2, from the start position S to a corner portion (a boundary) between the main surface 4 and the chamfered surface 6).

Also, when the shape of the main surface of the spacer 1 monotonously descends from the inner circumferential edge toward the outer circumferential edge in a cross-sectional view in the radial direction (including a case where the shape thereof non-linearly and monotonously descends, such a shape is referred to as a "substantially linear shape" hereinafter, see FIG. 8C), the start position S of the inclined surface 1A can be the inner circumferential edge of the main surface.

Note that the drop amount D can be measured using an optical interferometer, for example. Specifically, the drop amount D can be measured using a flatness tester FT-17 manufactured by NIDEK, for example. Data regarding the shape of the main surface of the spacer 1 is acquired, the height at the start position S of the inclined surface 1A and the height at the end position of the inclined surface 1A (the boundary portion between the main surface and the chamfered surface on the outer circumferential side) are measured by analyzing a cross-sectional shape of the spacer 1 in the radial direction thereof (i.e., by analyzing data regarding the height of the main surface of the spacer along a radial direction with the data shown as a profile), and a difference in the thickness direction thereof (the difference between the heights) is calculated. This measurement is repeated every 90 degrees with the center of the spacer 1 used as a reference to acquire four sets of data, and the average thereof can be used as the drop amount D of one main surface. Note that, as will be described later, when the main surface of the spacer 1 is to be ground and polished using a method similar to that when a substrate for a magnetic disk is manufactured, essentially a simultaneous double-sided processing apparatus is used, and thus the drop amounts D of the two main surfaces are substantially equal to each other.

Note that, in individual data regarding a profile in the radial directions, there are cases where the outer circumferential region of the main surface does not drop and the position of the edge on the outer circumferential side is the highest on the main surface. In such cases, it is sufficient that the above difference is calculated by assigning a sign opposite to that of the above drop amount. It is sufficient that the height of the edge on the outer circumferential side and the lowest height on the main surface profile are obtained, the difference therebetween in the thickness direction is calculated, and a sign opposite to the above drop amount is given to the difference, for example. Doing so makes it possible to calculate the difference together with the data regarding other drop amounts, the average of the drop amounts for the main surfaces 4 can be correctly obtained. An inclination angle of such an inclined surface 1A with respect to a horizontal portion of the main surface 4 is 0 degrees to 5 degrees or less, for example, and the inclined surface 1A differs from the chamfered surface having an inclination angle of 20 degrees or more, for example.

According to an embodiment, it is preferable that the thickness of the magnetic disk 5 to be installed in an HDD together with the spacer 1 is 80% or less of the thickness of the spacer 1. The thickness of the magnetic disk 5 is more preferably 70% or less, and even more preferably 50% or less of the thickness of the spacer 1. As the magnetic disk 5 becomes thinner, the pressing force applied from the clamping member 12 passes through the magnetic disk 5 and is likely to affect the spacer 1. Thus, the surface of the spacer 1 tends to deform in a recessed shape around the portion subjected to the pressing force. When the spacer 1 deforms into a recessed shape, the magnetic disk 5 follows this deformation and largely bends. As a result, an outer circumferential edge of the magnetic disk 5 deviates from a predetermined position in the plate thickness direction, thus causing problems such as contact with a ramp, for example. However, use of the spacer 1 according to this embodiment makes it possible to offset the recess of the spacer 1 in the above case, and to suitably prevent the magnetic disk 5 from bending. That is, it is possible to inhibit warpage of the magnetic disk 5. The thickness of the spacer 1 is 0.5 to 3 mm, for example, and the thickness of the magnetic disk 5 is 0.2 to 0.8 mm, for example. Although there is no particular limitation on the material of the substrate for the magnetic disk 5, it is possible to use glass substrates and aluminum alloy substrates, for example. Specifically, from the viewpoint that the spacer 1 is highly effective, glass substrates are more preferable because glass substrates have comparatively high rigidity.

Further, according to an embodiment, it is preferable that the Young's modulus of the spacer 1 is smaller than the Young's modulus of the substrate that constitutes the magnetic disk 5. Accordingly, a local pressing force applied from the clamping member 12 is readily transmitted to the spacer 1 without deforming or scratching the magnetic disk 5, and the portion of the main surface of the spacer 1 that is subjected to the pressing force applied by the clamping member 12 tends to be recessed, and as a result, it is possible to prevent the main surface of the spacer 1 from being recessed. In other words, the spacer 1 takes on the pressing force, thus facilitating deformation of the shape of the inclined surface 1A into a horizontal surface. The Young's modulus of the spacer 1 is 60 to 200 [GPa], for example, and the Young's modulus of the substrate that constitutes the magnetic disk 5 is 70 to 110 [GPa], for example. Note that, when amorphous glass is used as the material of the spacer 1, the Young's modulus of the spacer 1 is preferably 60 to 100 [GPa], for example.

The material of the glass spacer 1 is not specifically limited, and when glass is used as a material of the spacer 1, examples of the material include aluminosilicate glass, soda-lime glass, soda aluminosilicate glass, alumino-borosilicate glass, borosilicate glass, quartz glass, and crystallized glass. Specifically, amorphous glass is preferable because amorphous glass makes it easier to increase the smoothness of the surface of the spacer 1 and can be relatively easily processed. It is possible to use, as an aluminosilicate glass, an amorphous glass that contains, as components, silicon dioxide ($SiO_2$) in an amount of 59 to 63 mass %, aluminum oxide ($Al_2O_3$) in an amount of 5 to 16 mass %, lithium oxide ($Li_2O$) in an amount of 2 to 10 mass %, sodium oxide ($Na_2O$) in an amount of 2 to 12 mass %, and zirconium oxide ($ZrO_2$) in an amount 0 to 5 mass %, for example. An example of soda-lime glass that can be used is amorphous glass that contains, as components, $SiO_2$ in an amount of 65 to 75 mass %, $Al_2O_3$ in an amount of 1 to 6 mass %, CaO in an amount of 2 to 7 mass %, $Na_2O$ in an amount of 5 to 17 mass %, and $ZrO_2$ in an amount of 0 to 5 mass %.

A glass member, which will be a base of the spacer 1 can be obtained using any method, such as a method of manufacturing a glass plate using a float method, a down draw method, or the like and cutting the glass plate into an annular shape, a method of molding molten glass through pressing, or a method of manufacturing a glass tube through tube drawing and slicing the glass tube to a suitable length. It is possible to perform grinding (including chamfering) and polishing, which are similar to those used to manufacture a substrate for a magnetic disk on an edge surface (an outer circumferential surface or an inner circumferential surface) and main surfaces of the thus formed annular glass plate. The method for grinding and polishing the edge surface is not specifically limited, and the edge surface can be ground or polished using a formed grindstone that contains abrasive diamond particles of #80 to #1000, for example. Alternatively, the edge surface may be ground and polished using a polishing brush or polishing pad. Further, the edge surface can be ground and polished chemically using an etchant that contains hydrofluoric acid or silicofluoric acid. The inclined surface 1A of the main surface 4 can be formed by grinding or polishing the main surface 4, or by grinding and polishing the main surface 4. In the polishing process, the above-described drop amount D can be increased using a slurry containing alumina or silica abrasive particles, and a suede polishing pad made of soft polyurethane foam, for example. On the other hand, the outer circumferential region of the main surface can be warped upward using a slurry containing cerium abrasive particles and a suede polishing pad. Further, by changing or combining the concentration of the slurry and the hardness of the polishing pad, and other conditions, it is possible to obtain a flat main surface having no inclined surface or adjust the start position S of the inclined surface.

Although dimensions of the annular spacer 1 may be changed as appropriate according to the specifications of the HDD into which the spacer 1 is to be installed, if the spacer 1 is to be used in an HDD device for a nominal size of 3.5 inches, the outer diameter is 30 to 34 mm, for example, the inner diameter is 25 mm, for example, and the thickness is 0.5 to 3 mm, for example. If a chamfered surface (on the inner circumferential surface side or the outer circumferential surface side) is provided, the angle of the chamfered surface with respect to the main surface is 20 to 70 degrees, for example, and the width in the radial direction of the main surface is 50 to 500 μm, for example. The shape of the chamfered surface may be linear or curved in a cross-sectional view in the radial direction.

Also, although dimensions of the magnetic disk 5 may be changed as appropriate according to the specifications of the HDD into which the magnetic disk 5 is to be installed, if the magnetic disk 5 is to be used in an HDD device for a nominal size of 3.5 inches, the outer diameter is 85 to 100 mm, for example, the inner diameter is 25 mm, for example, and the thickness is 0.2 to 0.8 mm, for example.

According to an embodiment, it is preferable that a surface of the spacer 1 is provided with a conductive film. Examples of the material of the conductive film include nickel alloys such as nickel phosphorus (NiP), and conductive oxides such as tin oxide ($SnO_2$), zinc oxide (ZnO), titanium oxide, FTO in which tin oxide is doped with fluorine, and AZO in which zinc oxide is doped with aluminum oxide ($Al_2O_3$). By providing a conductive film on the surface of the spacer 1 in this manner, static electricity charged on the magnetic disk 5 can flow from the spacer 1 to the outside via the metal spindle 16, thereby adsorption of foreign matter and minute particles due to the static electricity charged on the magnetic disk 5 can be reduced in the HDD device. It is also possible to prevent dust from being released from the surface of the substrate of the spacer 1.

The base material of the spacer 1 having a conductive film may be made of glass, a ceramic material, or metal.

According to an embodiment, it is preferable that the magnetic disk 5 to be installed in an HDD together with the spacer 1 has a thickness of 0.55 mm or less. In the case of the magnetic disk 5 having a thickness of 0.55 mm or less, the pressing force applied by the clamping member 12 passes through the magnetic disk 5 and is likely to affect the spacer 1. Thus, the surface of the spacer 1 tends to deform in a recessed shape around the portion subjected to the pressing force. Further, because the magnetic disk 5 is thin, the magnetic disk 5 is likely to conform to the recessed spacer 1. As a result, the magnetic disk 5 is likely to bend. However, even in this case, the spacer 1 having the above-described inclined surface 1A is suitable because it can suppress and also prevent the above bending.

In an HDD device provided with such spacers 1 and the magnetic disks 5, as the number of magnetic disks 5 installed increases, the pressing force applied by the clamping member 12 needs to be increased in order to fix the magnetic disks 5. Thus, with a conventional spacer having no inclined surface 1A, as the number of magnetic disks 5 installed increases, the magnetic disks 5 warp further. However, by using the spacers 1 having the inclined surfaces 1A, the magnetic disks 5 are less likely to warp even when the clamping member 12 applies an increased pressing force. In this respect, in an HDD device in which nine or more magnetic disks 5 are installed, the spacers 1 having the inclined surfaces 1A function effectively. Also, in an HDD device in which ten or more magnetic disks are installed, the spacers 1 having the inclined surfaces 1A can be more effectively used. Further, in an HDD device in which eleven or more magnetic disks are installed, the spacers 1 having the inclined surfaces 1A can be even more effectively used.

A portion of the main surface 4 of the spacer 1 shown in FIG. 4 serves as the inclined surface 1A that is inclined such that the spacer 1 becomes thinner toward the corner portion present between the main surface 4 and the outer circumferential surface 2, and a portion on the inner circumferential surface side with respect to the inclined surface 1A that extends to the outer circumferential surface side is a horizontal surface that is not inclined. However, instead of the horizontal surface, the portion may be an inclined surface that is inclined such that the spacer 1 becomes thinner from the start position of the inclined surface 1A toward the corner portion present between the main surface 4 and the inner circumferential surface 3. In this case, the start position S of the inclined surface 1A is the position where the inclined surface 1A protrudes most upward.

Note that another modification example of the present invention is an annular spacer to be disposed such that a main surface of the spacer is in contact with a magnetic disk in a hard disk drive device.

A portion of the main surface on at least one side of the spacer is an inclined surface that is inclined away from the magnetic disk toward a corner portion present between the main surface and the outer circumferential surface of the spacer. In other words, a portion of the main surface on at least one side of the spacer is an inclined surface that is inclined to approach the main surface on the other side of the spacer toward the corner portion present between the main surface and the outer circumferential surface of the spacer. A "corner portion" in this specification refers to an edge between a main surface and a chamfered surface when the chamfered surface is provided between the main surface and the outer circumferential surface.

Yet another modification example of the present invention is an annular spacer to be disposed such that a main surface of the spacer is in contact with a magnetic disk in a hard disk drive device. A portion of the main surface on at least one side of the spacer is an inclined surface that is inclined such that the spacer becomes thinner toward a corner portion present between the main surface and the outer circumferential surface of the spacer.

EXAMPLES

The relationship between the drop amount D of the outer circumferential region of the main surface of the spacer and the amount of change in the flatness (warping amount) of a magnetic disk (fixed as the uppermost magnetic disk) before and after clamping was examined using an HDD in which nine magnetic disks were installed. Specifically, first, the uppermost magnetic disk and the spacer directly below the magnetic disk were detached from the spindle of the HDD, and the flatness of the detached magnetic disk was measured. Then, the spacer whose drop amount D was measured was attached to the spindle with the surface whose drop amount was measured facing upward, the magnetic disk whose flatness was measured in advance was successively attached to the spindle, and lastly fastening was carried out using a clamping member, and the flatness of the upper surface of the magnetic disk was measured in that state. Anything that interferes with measurement (ramp member and the like) was detached from the HDD in advance.

Note that the flatness (warping amount) of the magnetic disk was measured as the maximum height difference on the surface of the magnetic disk using Optiflat manufactured by Phase Shift Technology.

The specifications of the spacer and the magnetic disk were as follows:

Spacer: made of amorphous glass (Young's modulus: 72 GPa), the diameter of the outer circumferential surface was 32 mm, the diameter of the inner circumferential surface was 25 mm, the thickness was 1.8 mm, and the chamfered surface had a radial length of 250 μm on both the inner and outer circumferential sides and the angle with respect to the inner and outer circumferential surfaces was 45 degrees. The width L of the main surface was 3.0 mm.

Spacers whose inclined surfaces had various drop amounts D were manufactured by adjusting spacer manufacturing conditions in various ways.

Magnetic disk: A magnetic disk was obtained by forming a magnetic film and the like on a glass substrate, and the glass substrate had a Young's modulus of 80 GPa, a diameter of 97 mm, an inner diameter of 25 mm, and a substrate thickness of 0.5 mm.

Drop Amount D

A set of data was acquired every 90 degrees, for a total of four sets of data, and the average thereof was calculated.

The sign of the drop amount D was defined as follows:

When the main surface profile indicated an incline toward the other main surface in a direction toward the outer circumferential surface side (i.e., a descending shape) (that is, in the case of the spacer according to the present invention), the sign was defined as positive, whereas when the main surface profile indicated an increase in height to the outer circumferential surface side and reached the highest at the outer circumferential edge portion, the sign was defined as negative.

Amount of Change in Flatness

The flatness of magnetic disks is essentially greater after clamping than before clamping in many cases, but there are cases where the flatness of magnetic disks is greater before clamping than after clamping. Therefore, the amount of change in the flatness was indicated using an absolute value. It is possible to use a magnetic disk whose amount of change in flatness is 4 μm or less, preferably use a magnetic disk whose amount of change in flatness is 3 μm or less, and more preferably use a magnetic disk whose amount of change in flatness is 2.5 μm or less.

TABLE 1

|  | Drop Amount D (μm) | Amount of change in flatness (absolute value) (μm) |
|---|---|---|
| Com. Ex. 1 | −0.2 | 7.8 |
| Com. Ex. 2 | −0.1 | 6.5 |
| Com. Ex. 3 | 0 | 5.2 |
| Ex. 1 | 0.05 | 3.5 |
| Ex. 2 | 0.1 | 1.9 |
| Ex. 3 | 0.2 | 0.7 |
| Ex. 4 | 0.5 | 0.3 |
| Ex. 5 | 1.0 | 1.4 |
| Ex. 6 | 1.5 | 2.4 |
| Ex. 7 | 2.0 | 3.0 |
| Ex. 8 | 2.2 | 3.3 |

As shown in the above results, it was found that, by setting the drop amount D to more than 0 (positive), the amount of change in flatness is 4 μm or less. Also, it was found that, by setting the drop amount D to 0.1 to 2.0 μm, the amount of change in flatness is 3 μm or less. Further, it was found that, by setting the drop amount D to 0.1 to 1.5 μm, the amount of change in flatness is 2.5 μm or less.

Although the spacer and the hard disk drive device of the present invention have been described in detail, the present invention is not limited to the above-described embodiment, examples, and the like, and it goes without saying that various modifications and changes can be made within a scope not departing from the gist of the present invention.

One aspect of this disclosure is an annular spacer to be disposed such that a main surface of the spacer is in contact with a magnetic disk in a hard disk drive device.

The spacer includes: two main surfaces; an inner circumferential surface; and an outer circumferential surface, in which a chamfered surface is present between the outer circumferential surface and each of the two main surfaces, and at least a portion of an outer circumferential region of at least one of the two main surfaces includes an inclined region that is inclined toward the other main surface side in a radial direction from a center of the spacer to the outer circumferential surface side.

It is preferable that a drop amount of the inclined region that is inclined toward the other main surface side is 0.1 to 2 μm.

It is preferable that the inclined region is a curved surface that protrudes in a direction from the inside to the outside of the spacer.

It is preferable that the thickness of the magnetic disk is 80% or less of the thickness of the spacer.

It is preferable that a material of the spacer contains glass.

It is preferable that the Young's modulus of the spacer is smaller than the Young's modulus of a substrate that constitutes the magnetic disk.

It is preferable that the spacer includes a conductive film on a surface of the spacer.

It is preferable that the magnetic disk has a thickness of 0.55 mm or less.

Another aspect of this disclosure is a hard disk drive device including: the spacer; and the magnetic disk.

Another aspect of this disclosure is a hard disk drive device including: ten or more magnetic disks; and the spacer.

It is preferable that a substrate for the magnetic disks is made of glass.

According to the above-described spacer, it is possible to suppress deterioration in flatness of magnetic disks fixed using a clamp.

LIST OF REFERENCE NUMERALS

1 Glass spacer
1A Inclined surface
2 Outer circumferential surface
3 Inner circumferential surface
4 Main surface
5 Magnetic disk
10 Hard disk drive device
12 Clamping member
14 Protrusion
16 Spindle
18 Rotation shaft

What is claimed is:

1. A hard disk drive comprising:
a magnetic disk; and
an annular spacer including
two main surfaces,
an inner circumferential surface,
an outer circumferential surface, and
a chamfered surface present between the outer circumferential surface and each of the two main surfaces,
the annular spacer being disposed such that one of the two main surfaces is in contact with the magnetic disk,
wherein
at least one main surface of the two main surfaces includes an inclined region, and the inclined region is inclined in an outer circumferential region of the at least one main surface toward a boundary between the at least one main surface and the chamfered surface such that a surface height of the spacer gradually decreases toward the boundary, the magnetic disk has a thickness of 0.55 mm or less, and a material of a substrate for the magnetic disk includes aluminum alloy.

2. The hard disk drive according to claim 1, wherein a drop amount of the inclined region that is inclined toward the other main surface side of the spacer is 0.1 to 2 μm.

3. The hard disk drive according to claim 2, wherein a Young's modulus of a material of the spacer is smaller than a Young's modulus of the substrate that constitutes the magnetic disk.

4. The hard disk drive according to claim 3, further comprising
ten or more magnetic disks.

5. The hard disk drive according to claim 3, wherein the spacer has a conductive film on a surface of the spacer.

6. The hard disk drive according to claim 5, further comprising
ten or more magnetic disks.

7. The hard disk drive according to claim 2, wherein the spacer has a conductive film on a surface of the spacer.

8. The hard disk drive according to claim 7, further comprising
ten or more magnetic disks.

9. The hard disk drive according to claim 2, further comprising
ten or more magnetic disks.

10. The hard disk drive according to claim 1, wherein the inclined region of the spacer is a curved surface that protrudes in a direction from the inside to the outside of the spacer.

11. The hard disk drive according to claim 1, wherein a Young's modulus of a material of the spacer is smaller than a Young's modulus of the substrate that constitutes the magnetic disk.

12. The hard disk drive according to claim 11 further comprising
ten or more magnetic disks.

13. The hard disk drive according to claim 11, wherein the spacer has a conductive film on a surface of the spacer.

14. The hard disk drive according to claim 13 further comprising
ten or more magnetic disks.

15. The hard disk drive according to claim 1, wherein a material of the spacer includes aluminum or aluminum alloy.

16. The hard disk drive according to claim 15, wherein the spacer has a conductive film on a surface of the spacer.

17. The hard disk drive according to claim 16, further comprising
ten or more magnetic disks.

18. The hard disk drive according to claim 1, wherein the spacer has a conductive film on a surface of the spacer.

19. The hard disk drive according to claim 18, further comprising
ten or more magnetic disks.

20. The hard disk drive according to claim 1, further comprising
ten or more magnetic disks.

* * * * *